(12) United States Patent
Borriello

(10) Patent No.: US 10,795,345 B2
(45) Date of Patent: Oct. 6, 2020

(54) METHOD FOR ELABORATING WORK ORDERS TO BE EXECUTED BY A MES/MOM SYSTEM

(71) Applicant: SIEMENS AKTIENGESELLSCHAFT, Munich (DE)

(72) Inventor: Diego Borriello, Chiavari (IT)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 15/950,605

(22) Filed: Apr. 11, 2018

(65) Prior Publication Data

US 2018/0307213 A1 Oct. 25, 2018

(30) Foreign Application Priority Data

Apr. 20, 2017 (EP) .................................. 17167259

(51) Int. Cl.
*G05B 19/418* (2006.01)
*G06Q 10/00* (2012.01)

(52) U.S. Cl.
CPC ......... *G05B 19/4188* (2013.01); *G06Q 10/00* (2013.01); *G05B 2219/31001* (2013.01); *G05B 2219/34379* (2013.01)

(58) Field of Classification Search
CPC ...... G05B 19/4188; G05B 2219/31001; G05B 2219/34379
See application file for complete search history.

(56) References Cited

U.S. PATENT DOCUMENTS

| | | | | |
|---|---|---|---|---|
| 4,823,255 A | * | 4/1989 | Tanaka | G05B 19/40938 700/86 |
| 5,835,765 A | * | 11/1998 | Matsumoto | G06F 9/4843 718/102 |
| 2002/0072823 A1 | * | 6/2002 | Belanger | G05B 19/4142 700/159 |
| 2007/0162157 A1 | * | 7/2007 | Chandhoke | G05B 19/056 700/17 |
| 2016/0189078 A1 | * | 6/2016 | Gajdzinski | G06Q 10/06375 705/7.37 |
| 2017/0129180 A1 | * | 5/2017 | Coates | B33Y 30/00 |

FOREIGN PATENT DOCUMENTS

| | | |
|---|---|---|
| EP | 2866110 A2 | 4/2015 |
| EP | 2996073 A1 | 3/2016 |

* cited by examiner

*Primary Examiner* — Chun Cao
(74) *Attorney, Agent, or Firm* — Laurence Greenberg; Werner Stemer; Ralph Locher

(57) ABSTRACT

A method for elaborating work orders to be performed by a system capable of driving manufacturing machinery, in particular a Manufacturing Execution System (MES) or Manufacturing Operation Management (MOM) includes providing work orders containing a series of part programs, the part programs containing information regarding tools to be employed and/or information about a priority of execution. The part programs are read and ordered according to an order of execution, on the basis of the information.

10 Claims, 1 Drawing Sheet

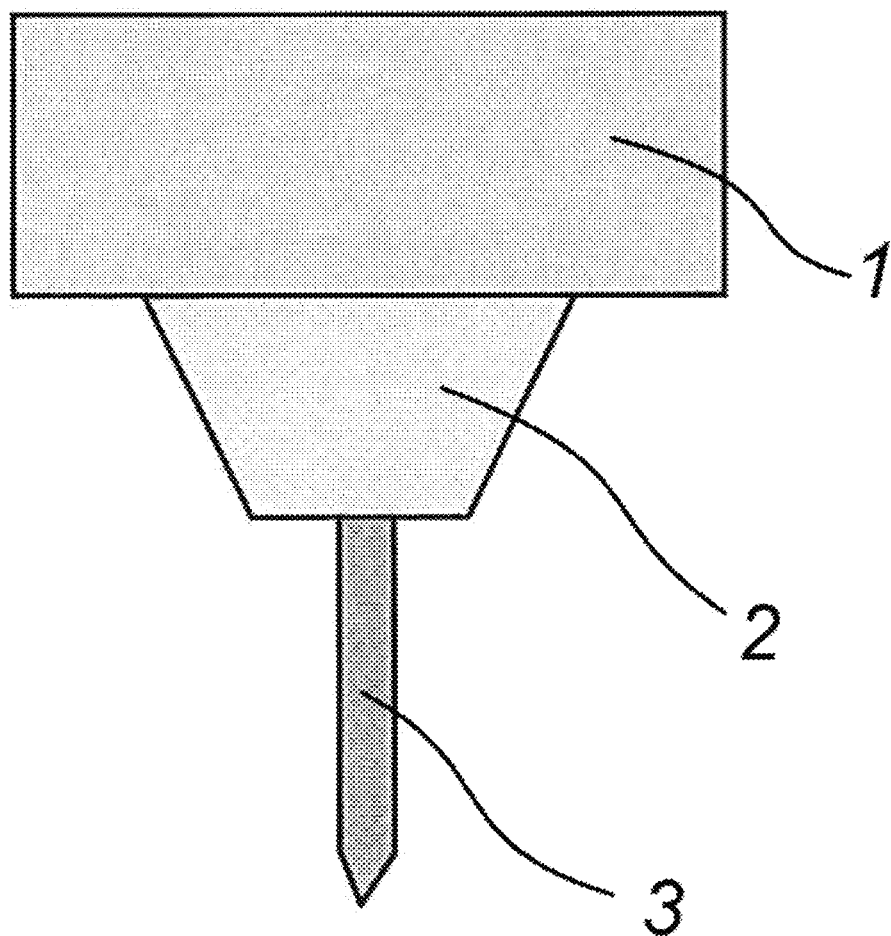

METHOD FOR ELABORATING WORK ORDERS TO BE EXECUTED BY A MES/MOM SYSTEM

CROSS-REFERENCE TO RELATED APPLICATION

This application claims the priority, under 35 U.S.C. § 119, of German application EP 17167259.5, filed Apr. 20, 2017; the prior application is herewith incorporated by reference in its entirety.

BACKGROUND OF THE INVENTION

Field of the Invention

The invention relates to a method for determining the order of part programs to be executed by system driving manufacturing machinery, in particular a manufacturing execution system (MES) or manufacturing operation management (MOM).

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens Corporation offers a broad range of MES/MOM products under its SIMATIC IT® product family.

A MES/MOM system is capable to perform execution of manufacturing steps on the basis of work orders which are usually presented as a list of part programs. The part programs are files available to the system, (for example contained in a suitable storing devices or loaded by an operator) and are capable of being read by the system (i.e. files, usually text-format files, with codified instructions). The part programs contain a series of instructions that the system must perform by driving the machinery under its control.

Each part program can contain instruction relative operations to be performed by elements containing one or more interchangeable tools to be assembled together. For example a machine consists of a motor, a chuck and a tool adapted to directly act on a piece to be worked, such as a drill, a mill or other.

It often happens that, in the same working order, a tool can be assembled with different tools of another kind. For example, different tools acting on the piece, or, simply tools of different dimensions, can be required and, among them, part need the use of a chuck, and part of a different chuck. Also the motor can be changed, depending on the chuck to be used, and/or on the tool acting on the piece. Following the order contained in the working orders, can result in that a series of unneeded operations, relating to interchanging the tools must be performed.

It also happens that certain part programs would better be executed in order different from that contained in a working order, due to different causes, e.g. availability of certain resources, scheduled vacation of staff members. Therefore, the order of part programs on a working order can lead to a series of not needed operations and possible machine stops, resulting in delays.

Up to date, the operators, according to their experience, can change the orders of the part programs to be loaded to the system driving the manufacturing operations.

SUMMARY OF THE INVENTION

The problems mentioned above have now been solved by a method for elaborating work orders to be performed by a system capable of driving manufacturing machinery, in particular a manufacturing execution system (MES) or manufacturing operation management (MOM) containing the following steps:'
   providing work orders containing a series of part programs, the part programs containing information regarding tool elements to be employed and/or information about a priority of execution; and
   reading the part programs and ordering the part programs according to an order of execution, on the basis of the information.

According to a preferred embodiment, the method further contains the step of performing the part programs in the order of execution by a system as mentioned above.

Other features which are considered as characteristic for the invention are set forth in the appended claims.

Although the invention is illustrated and described herein as embodied in a method for elaborating work orders to be executed by a MES/MOM system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE VIEW OF THE DRAWING

The FIGURE is a schematic representation of a machinery organ composed of three tools according to the invention.

DETAILED DESCRIPTION OF THE INVENTION

Referring now to the single FIGURE of the drawing in detail thereof, there is shown a machinery organ having a plurality of tools e.g. three tools, tool 1, tool 2 and tool 3 designated with reference signs 1, 2 and 3 respectively.

The tools are interchangeable, each of the three tools can be constituted by an element (the indication of the element being contained in the part program) which can be replaced by another of different kind or size according to a particular part program to be performed. In particular one single element can be, along the performance of a work order composed of several part programs, coupled with different elements. For example, tool 1 can be a driving unit containing a motor, tool 2 can be a chuck and tool 3 a drill or a mill.

According to an embodiment, the information contained in the part programs can simply relate to the components, and their use as a particular tool can be available to the system or to a software implementing the method.

Drills of different sizes or mills can require the same chuck or different chucks, and different chucks can require the same or different drive units. It can also happen that the same chuck can be used with different drive units, depending on the operation to be performed, for example due to different power requirements or movement possibilities.

See for example table 1, reporting in the first column the part program composing a work order, listed and numbered as ordered in the work orders, as it is compiled or comes from an enterprise resource planning (ERP) installation.

TABLE 1

| Part program | Tool 1 | Tool 2 | Tool 3 | Work order | Operation |
|---|---|---|---|---|---|
| PP001 | a | c | f | 01 | 10 |
| PP002 | a | d | e | 01 | 10 |
| PP003 | b | c | g | 01 | 20 |
| PP004 | a | d | h | 02 | 10 |
| PP005 | a | c | l | 03 | 50 |

There are considered three different work orders, listed in the fourth column. The part programs of a single work order are sometimes organized in operations containing one or more part programs, as shown in the last column. The letters refer to interchangeable elements to be used, according to each part program, as the tool listed in the reference line.

According to the original order, passing from a part program to the following, each time a change of the tool element 3, and again of the tool element 2; the tool element 1 needs to be changed twice. The order of the part programs can then be redefined as per table 2.

TABLE 2

| Part program | Tool 1 | Tool 2 | Tool 3 | Work order | Operation |
|---|---|---|---|---|---|
| PP001 | a | c | f | 01 | 10 |
| PP005 | a | c | i | 03 | 50 |
| PP002 | a | d | e | 01 | 10 |
| PP004 | a | d | h | 02 | 10 |
| PP003 | b | c | g | 01 | 20 |

As can be appreciated, the changes of tool element 1 are reduced to one, and those of tool element 2 to two (one, anyway, in concomitance with the change of tool element 1). Tool element 3 can be twice changed while keeping the same elements as tool 1 and 2. Thus, changing operations can be severely reduced and the working time lowered.

According to an embodiment of the invention, data regarding the tools to be used can be read by a program capable of parsing the part programs or can be provided as metadata of a part program.

According to a further embodiment, the various tools used by each of a series of part programs can be ranked in a tool priority order. Then the part programs foreseeing the same element as the tool of the highest priority are grouped together and the groups are ordered in the execution order. Then, within the same group, the part programs are further grouped based on the tool having the immediately lower priority and then according to a further lower priority, up to the lowest priority.

It can be appreciated that a tool has a tool priority higher of a second if it can be kept unchanged when the second is changed.

In the example of the FIGURE and of the tables, tool 1 has the highest priority, tool 3 the lowest. The priority of the tools can be contained in the part programs (e.g. the tools can be quoted in order of priority), optionally as metadata or can available to the software performing the method as operative data (e.g. from databases or inserted by an operator).

The invention also relates to a software capable of performing the above mentioned step. Software can be integrated in a MES/MOM system, which can interact with an appropriate scheduling system and with a part program management system. However, the software can also be not part of the MES/MOM system, and different schemes of interaction can be developed. The program, according to a particular embodiment, can create a schedule of part programs from all the work orders available.

According to a further embodiment, the method contains the step of reading information regarding a part program priority, and the part program order of execution is established by decreasing part program priority. Again, the part programs can contain part program priority (e.g. different levels of priority can be attributed as numbers or categories) and can be contained in the part program file or as metadata. The information of part program priority can derive also from the filename or other file identification items, if the association between the identification items and the priority level are appropriately available to the software performing the method.

The execution order can also be created on the basis of both tool element data and part program priority of execution. For example, program priority can be used for a first ordering, then ordering within part programs with same part program priority can be performed on the tool element basis as above described.

The following is a summary list of reference numerals and the corresponding structure used in the above description of the invention:
1 Tool 1
2 Tool 2
3 Tool 3

The invention claimed is:

1. A method for elaborating a work order and performing the work order by a system capable of driving manufacturing machinery, which comprises the following steps of:
   providing work orders containing a series of part programs, the part programs having information regarding tool elements to be employed and/or information about a part program priority of execution; and
   reading the part programs and ordering the part programs according to an order of execution, on a basis of the information;
   grouping the part programs, in an execution order, according to a common tool element to be used as a specific tool;
   further grouping the part programs, in an execution order, according to further common tool elements to be used as a further specific tool, wherein the common tool element is a first type of tool and each of the further common tool elements is a type of tool that is different from the first type of tool; and
   performing, by the system, an execution of the part programs in the order of execution of the further grouping of the part programs.

2. The method according to claim 1, wherein data regarding the tools to be used can be read by a program capable of parsing the part programs or can be provided as metadata of a part program.

3. The method according to claim 1, which further comprises creating a schedule of the part programs from all the work orders available.

4. The method according to claim 1, wherein each of the part programs foresees a use of at least one of the tool elements.

5. The method according to claim 1, which further comprises performing the grouping and the further grouping according to a predetermined tool priority.

6. The method according to claim 1, wherein an execution order is established with a decreasing part program priority.

7. The method according to claim 1, which further comprises selecting the system from the group consisting of manufacturing execution systems (MES) and manufacturing operation managements (MOM).

8. The method according to claim 1, wherein the order of execution of the further grouping of the part programs reduces a number of tool changes required in comparison to a number of tool changes required by the part programs in the work orders that were provided.

9. A non-transitory computer readable memory having computer executable instructions for performing a method for elaborating a work order and performing the work order by a system capable of driving manufacturing machinery, which comprises the following steps of:

provide work orders containing a series of part programs, the part programs having information regarding tool elements to be employed and/or information about a part program priority of execution;

reading the part programs and ordering the part programs according to an order of execution, on a basis of the information;

grouping the part programs, in an execution order, according to a common tool element to be used as a specific tool;

further grouping the part programs, in an execution order, according to further common tool elements to be used as a further specific tool, wherein the common tool element is a first type of tool and each of the further common tool elements is a type of tool that is different from the first type of tool; and performing, by the system, an execution of the part programs in the order of execution of the further grouping of the part programs.

10. The non-transitory computer readable memory according to claim 9, wherein the order of execution of the further grouping of the part programs reduces a number of tool changes required in comparison to a number of tool changes required by the part programs in the work orders that were provided.

* * * * *